United States Patent
Marx et al.

(10) Patent No.: US 9,546,593 B2
(45) Date of Patent: Jan. 17, 2017

(54) METHOD FOR REGULATING STABLE OPERATION OF AN EXHAUST-GAS TURBOCHARGER OF AN INTERNAL COMBUSTION ENGINE, AND A CORRESPONDING APPARATUS

(71) Applicant: KNORR-BREMSE Systeme fuer Nutzfahrzeuge GmbH, Munich (DE)

(72) Inventors: Manuel Marx, Weichs (DE); Guang Rao, Munich (DE)

(73) Assignee: KNORR-BREMSE Systeme fuer Nutzfahzeuge GmbH, Munich (DE)

( * ) Notice: Subject to any disclaimer, the term of this patent is extended or adjusted under 35 U.S.C. 154(b) by 1010 days.

(21) Appl. No.: 13/766,818

(22) Filed: Feb. 14, 2013

(65) Prior Publication Data

US 2013/0152580 A1 Jun. 20, 2013

Related U.S. Application Data

(63) Continuation of application No. PCT/EP2011/063972, filed on Aug. 12, 2011.

(30) Foreign Application Priority Data

Aug. 18, 2010 (DE) .................. 10 2010 034 727

(51) Int. Cl.
*F02B 33/44* (2006.01)
*F02B 47/08* (2006.01)
(Continued)

(52) U.S. Cl.
CPC .............. *F02B 47/08* (2013.01); *F02B 33/44* (2013.01); *F02B 37/04* (2013.01); *F02B 37/164* (2013.01);
(Continued)

(58) Field of Classification Search
CPC ........... F02B 47/08; F02B 33/44; F02B 37/04; F02B 37/164; F02B 37/16; F02D 23/00; F02D 41/0007
(Continued)

(56) References Cited

U.S. PATENT DOCUMENTS 7,762,069 B2 7/2010 Gerum
8,479,514 B2 7/2013 Mayr
(Continued)

FOREIGN PATENT DOCUMENTS

CN 101031704 A 9/2007
CN 101680374 A 3/2010
(Continued)

OTHER PUBLICATIONS

Chinese Office Action dated Jul. 3, 2014 (eight pages).
(Continued)

*Primary Examiner* — Nicholas J Weiss
*Assistant Examiner* — Jason T Newton
(74) *Attorney, Agent, or Firm* — Crowell & Moring LLP (57) ABSTRACT

A method and apparatus is provided for regulating stable operation of an exhaust-gas turbocharger of an internal combustion engine having a fresh-gas supply device, a switchover valve, a control device, a compressor for generating compressed air and an air-processing unit with a discharge valve. The compressor is operated in a suction intake mode in which the compressor is connected to an air inlet, and based on monitored operating parameters, the switchover valve switches the compressor from the suction intake mode into a pressure-charged in which the compressor is connected to an exhaust-gas turbocharger compressor. Based on monitored operating parameters when in the
(Continued)

pressure-charged mode, the switchover valve switches the compressor from the pressure-charged mode into the suction intake mode.

10 Claims, 5 Drawing Sheets

(51) Int. Cl.
 *F02D 23/00* (2006.01)
 *F02B 37/04* (2006.01)
 *F02B 37/16* (2006.01)
 *F02D 41/00* (2006.01)
(52) U.S. Cl.
 CPC ............... *F02D 23/00* (2013.01); *F02B 37/16* (2013.01); *F02D 41/0007* (2013.01); *Y02T 10/144* (2013.01)
(58) Field of Classification Search
 USPC .... 60/599, 605.1, 600, 605.2; 701/108, 102; 123/559.1, 563
 See application file for complete search history.

(56) References Cited

U.S. PATENT DOCUMENTS

| | | | |
|---|---|---|---|
| 2002/0031454 A1 | 3/2002 | Ooe et al. | |
| 2007/0246008 A1* | 10/2007 | Gerum | B60T 17/02 123/316 |
| 2008/0066467 A1* | 3/2008 | Nemeth | F02B 21/00 60/606 |
| 2008/0072595 A1 | 3/2008 | Nemeth et al. | |
| 2009/0217898 A1* | 9/2009 | Gokhale | F02B 21/00 123/179.18 |
| 2009/0320466 A1* | 12/2009 | Vetrovec | F02B 33/44 60/602 |
| 2010/0122687 A1 | 5/2010 | Gerum et al. | |
| 2010/0139266 A1* | 6/2010 | Gerum | F02B 21/00 60/600 |
| 2011/0252784 A1* | 10/2011 | Rebhan | F02B 33/44 60/600 |
| 2011/0288741 A1* | 11/2011 | Schaffeld | F02B 33/34 701/102 |
| 2012/0067044 A1 | 3/2012 | Marx et al. | |
| 2012/0216531 A1* | 8/2012 | Schaffeld | F02B 33/34 60/611 |
| 2012/0216533 A1* | 8/2012 | Schaffeld | F02B 33/44 60/611 |
| 2012/0221223 A1* | 8/2012 | Schaffeld | F02B 33/38 701/102 |

FOREIGN PATENT DOCUMENTS

| | | |
|---|---|---|
| DE | 196 37 571 A1 | 3/1998 |
| DE | 10 2004 047 975 A1 | 4/2006 |
| DE | 10 2007 027 968 A1 | 1/2009 |
| DE | 10 2007 033 693 A1 | 1/2009 |
| DE | 10 2008 036 637 A1 | 2/2010 |
| EP | 1 956 213 A1 | 8/2008 |
| JP | 2008-514854 A | 5/2008 |
| JP | 2008-531907 A | 8/2008 |
| JP | 2008-223544 A | 9/2008 |
| JP | 2009-264198 A | 11/2009 |
| WO | WO 2006/089779 A1 | 8/2006 |
| WO | WO 2007/058524 A1 | 5/2007 |
| WO | WO 2009/100883 A1 | 8/2009 |
| WO | WO 2010/089087 A1 | 8/2010 |

OTHER PUBLICATIONS

International Preliminary Report on Patentability (PCT/IB/338 & PCT/IB/373), including Written Opinion (PCT/ISA/237) dated Feb. 19, 2013 (twelve (12) pages).
Japanese-language Office Action dated May 25, 2015 with English translation (Thirteen (13) pages).
International Search Report with English translation dated Oct. 25, 2011 (six (6) sheets).
German Office Action with English translation dated Oct. 26, 2011 (ten (10) sheets).
Wolfgang W. Gnadt, "Turbo Motoren", Bartsch Verlag 1984, pp. 41-47 (nine (9) sheets).

* cited by examiner

METHOD FOR REGULATING STABLE OPERATION OF AN EXHAUST-GAS TURBOCHARGER OF AN INTERNAL COMBUSTION ENGINE, AND A CORRESPONDING APPARATUS

CROSS REFERENCE TO RELATED APPLICATIONS

This application is a continuation of PCT International Application No. PCT/EP2011/063972, filed Aug. 12, 2011, which claims priority under 35 U.S.C. §119 from German Patent Application No. DE 10 2010 034 727.2, filed Aug. 18, 2010, the entire disclosures of which are herein expressly incorporated by reference.

BACKGROUND AND SUMMARY OF THE INVENTION

The invention relates to a method for regulating stable operation of an exhaust-gas turbocharger of an internal combustion engine. The invention also relates to an apparatus for carrying out such a method.

In certain operating states, especially when there is a torque demand, an internal combustion engine with an exhaust-gas turbocharger has phases in which there is an inadequate supply of compressed fresh air by the exhaust-gas turbocharger, giving rise to what is known as turbo lag. To eliminate this turbo lag, the increased air requirement is covered by a fresh-gas supply device by an additional fresh air supply, and the "transient performance" of the internal combustion engine is enhanced.

This additional fresh air can be taken from a compressed-air reservoir of a vehicle air system, for example. An increased air requirement can lead to adaptations to a compressor or air compressor supplying the compressed-air reservoir. In this case, pressure charging of the compressor can be performed, i.e. it receives charge air as inlet air downstream of the compressor of the exhaust-gas turbocharger in accordance with certain operating parameters of the internal combustion engine. In this way, it is possible to fully cover the increased air requirement.

The majority of compressors are mechanically driven, e.g. by the crankshaft of the internal combustion engine. Continuously pressure-charged compressors are also part of the prior art, especially in the USA.

Electronically regulated air-processing systems are likewise part of the prior art and are fitted as standard in commercial vehicles with air brakes. The electronic air-processing system contains a solenoid shutoff valve.

A fresh-gas supply device is known from WO2006/089779A1, for example.

All systems per se provide advantages in terms of fuel savings, emissions and/or the transient performance of a vehicle.

Figure 1:
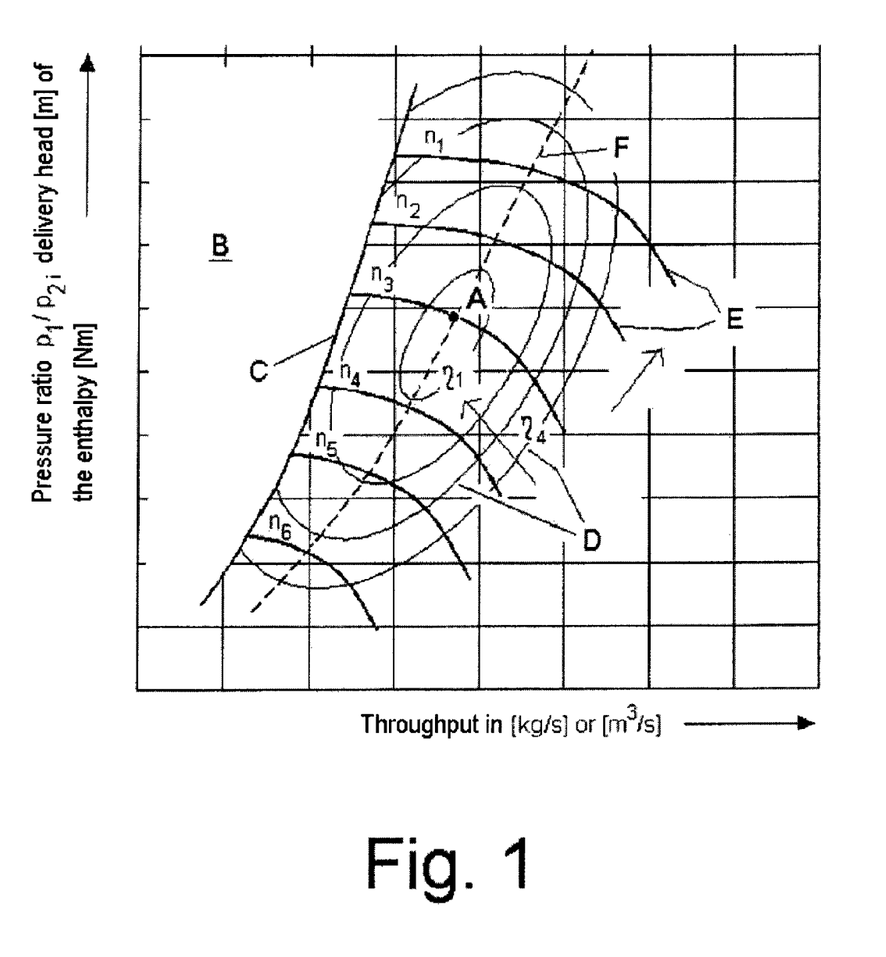
FIG. 1 shows a compressor characteristic map.

However, the operation of an exhaust-gas turbocharger may become unstable, something that may be caused by the occurrence of turbocharger "pumping" and is not prevented. Turbocharger pumping is caused by separation of the flow at the compressor blades. Separation of the flow occurs if a pumping limit is reached, i.e. in the case of certain relationships between the pressure conditions and the mass flow. In this respect, FIG. 1 shows a compressor characteristic map for a compressor of an exhaust-gas turbocharger. A throughput or mass flow is plotted on the abscissa, and a pressure ratio and delivery head of the enthalpy is plotted on the ordinate. In this case, families of characteristics are shown, of which the designation E is for characteristics at a constant speed n of the compressor. Characteristics E are plotted for six speeds n1 to n6, where n1>n6. Characteristics η1 to η4 with the same efficiency, where η1>η4, are furthermore indicated by the reference sign D. The point of intersection in a field of optimum efficiency η1 with a speed n3 and a characteristic F for surge-free inflow indicates a design point or operating point A. On the left hand side, i.e. toward low throughputs or mass flows, this family of characteristics is delimited with respect to an unstable range B by a pumping limit C.

Pumping causes high dynamic loads on the compressor blades and can lead to failure of the turbocharger.

During the air injection process by the fresh-gas supply device, the pumping limit C may be reached owing to a closed flap, which prevents the injected air from flowing back to the compressor of the turbocharger. This results from the fact that the turbocharger delivers the air downstream of the compressor against the closed flap. As a result, there is an ever decreasing mass flow and a simultaneous rise in the pressure ratio.

It is therefore the object of the invention to provide an improved method for regulating stable operation of an exhaust-gas turbocharger of an internal combustion engine.

One concept of the invention consists in regulating a stable range of an exhaust-gas turbocharger through the interaction of participating and already existing components of an internal combustion engine by switching over a compressor from a suction intake mode to a pressure-charged mode and back again on the basis of monitored operating parameters.

System behavior is thereby improved since an operating point of the exhaust-gas turbocharger remains in a stable range and does not enter an unstable range. In this way, turbocharger "pumping" is advantageously prevented.

Accordingly, a method for regulating stable operation of an exhaust-gas turbocharger of an internal combustion engine having a fresh-gas supply device, a switchover valve, a control device, a compressor and an air-processing unit with a discharge valve has the following method steps:

operating the compressor in a suction intake mode, wherein the switchover valve connects the compressor to an air inlet, and monitoring operating parameters of the internal combustion engine, of the air-processing unit and of the exhaust-gas turbocharger;

regulating stable operation of the exhaust-gas turbocharger on the basis of the monitored operating parameters by switching over the compressor from the suction intake mode to a pressure-charged mode, with the switchover valve connecting the compressor to a compressor of the exhaust-gas turbocharger; and switching over the compressor on the basis of the monitored operating parameters from the pressure-charged mode into the suction intake mode, with the switchover valve connecting the compressor to the air inlet again.

With the aid of the switchover valve, which may also be termed an intelligent switchover valve, it is now possible to make a switch in the air system between a naturally aspirated mode of the compressor (taking the air from an air inlet ahead of the compressor of the exhaust-gas turbocharger) and a pressure-charged mode of the compressor (taking the compressed air after the compressor).

The control device determines the position of the switchover valve in accordance with various operating parameters, e.g. the engine speed and boost pressure.

Regulation can also involve monitoring a boost pressure and/or a mass flow of the compressor of the exhaust-gas turbocharger. In this case, the respectively current parameter determined is compared with a predeterminable limiting value, for example. If, for example, the boost pressure of the compressor nevertheless continues to rise, the outlet of the compressor can be connected to the atmosphere by opening the discharge valve. In a further embodiment, this can also be performed in stages or continuously, allowing particularly good adaptation to the respective operating state.

In the method step of regulation, operation of the fresh-gas supply device can form a monitored operating parameter. The switching-over of the compressor from the suction intake mode to the pressure-charged mode then takes place when the fresh-gas supply device is activated, and the switching-over of the compressor from the pressure-charged mode to the suction intake mode takes place after the fresh-gas supply device has been activated. These operating parameters are already available as signals, e.g. from an engine controller, and do not have to be additionally generated.

In the process of regulation, it is also possible for an overrun phase of the internal combustion engine and operation of the fresh-gas supply device to form monitored operating parameters. When the fresh-gas supply device is not in operation, the switching-over of the compressor from the suction intake mode to the pressure-charged mode takes place at the beginning of an overrun phase and the switching-over of the compressor from the pressure-charged mode to the suction intake mode takes place after the end of the overrun phase. In this way, the charge-air energy produced during the overrun phase is also used to produce and store compressed air.

It is also possible to eliminate a "waste gate valve" of an exhaust-gas turbocharger, if fitted therewith. In the method step of regulation, the operating parameters for operation of the waste gate valve of the exhaust-gas turbocharger in this case form monitored operating parameters, wherein a signal for opening the waste gate valve brings about the switching-over of the compressor from the suction intake mode to the pressure-charged mode and a signal for closing the waste gate valve brings about the switching-over of the compressor from the pressure-charged mode to the suction intake mode.

An apparatus for carrying out a method for regulating stable operation of an exhaust-gas turbocharger of an internal combustion engine has the following: a fresh-gas supply device for injecting additional air into the internal combustion engine when there is a requirement for transient power; a compressor for producing compressed air; and an air-processing unit for the compressed air, having a discharge valve. The apparatus is characterized by a switchover valve and a control device. The switchover valve connects the compressor to an air inlet in a suction intake mode of the compressor and connects the compressor to a compressor of the exhaust-gas turbocharger in a pressure-charged mode of the compressor. The control device is used to control the switchover valve for regulating stable operation of an exhaust-gas turbocharger.

The control device can also be designed to control the discharge valve, thereby making possible more appropriately tailored regulation of stable operation of the exhaust-gas turbocharger.

In one embodiment, the control device can be part of an engine controller or of the air-processing unit. Thus, no additional installation space is required.

In another embodiment, the fresh-gas supply device can have a throttle valve and an additional-air valve. If said valves and/or the discharge valve are valves that can be adjusted in stages or continuously, extensive further adaptation to specific operating conditions is possible.

The apparatus described is suitable for carrying out the method described above.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 2:
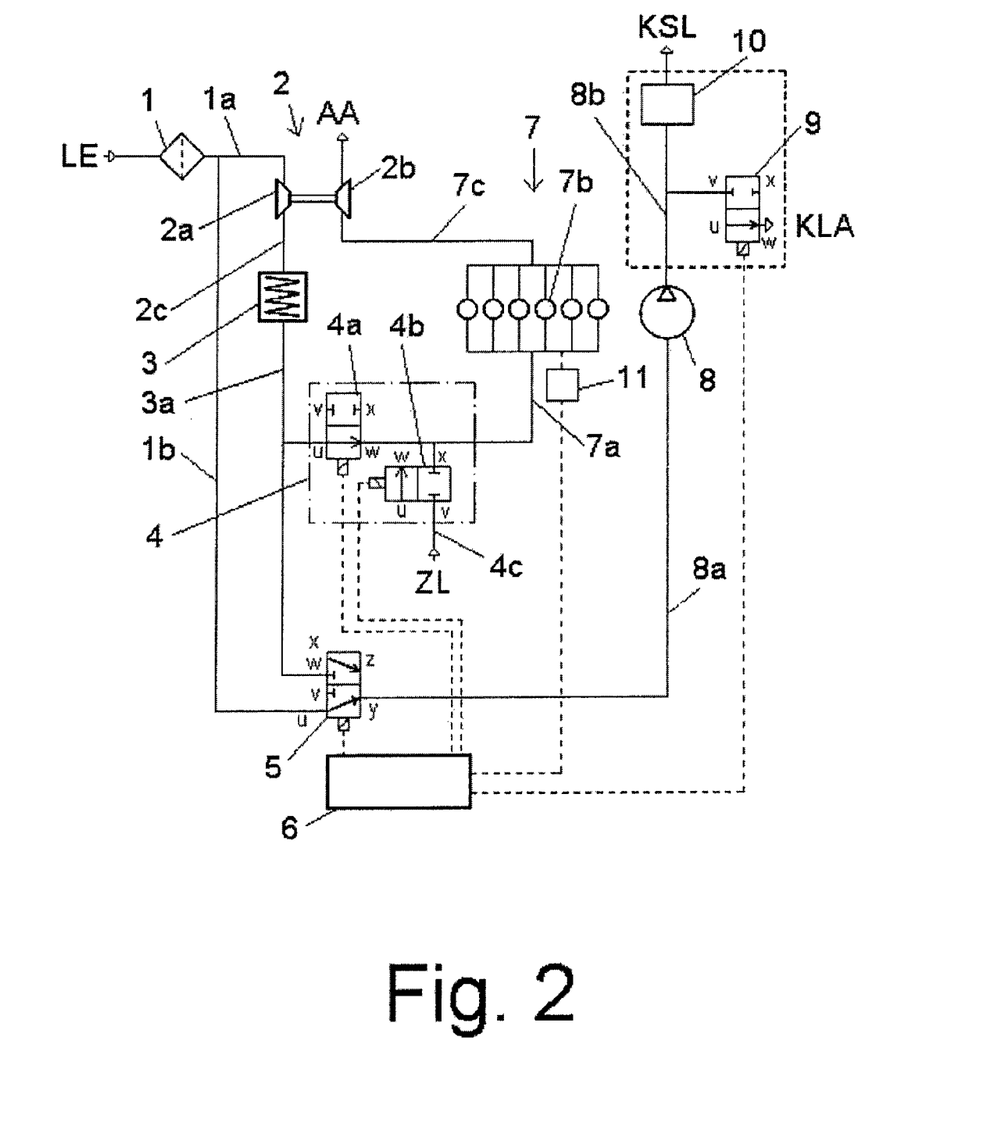
FIG. 2 shows a schematic block diagram of an internal combustion engine having an embodiment of an apparatus in accordance with the present invention in a first operating state.

FIG. 2 shows a schematic block diagram of an internal combustion engine 7 having an embodiment of an apparatus according to the present invention for carrying out a method according to the invention, in a first operating state.

The apparatus for carrying out a method for regulating stable operation of an exhaust-gas turbocharger 2 of an internal combustion engine 7 comprises a fresh-gas supply device 4, a compressor 8 for producing compressed air for a compressed-air system having an air-processing unit 10 and a discharge valve 9, a switchover valve 5 and a control device 6.

An air inlet LE is used to draw in fresh air from the atmosphere for the internal combustion engine 7, which is shown with an intake manifold 7a, six cylinders 7b and an exhaust line 7c. The air inlet LE is connected to an air filter 1, downstream of which an intake line branches into a compressor intake line 1a and an intake line 1b.

The compressor intake line 1a is connected to a compressor 2a of the exhaust-gas turbocharger 2, the compressor 2a being coupled to a turbine 2b of the exhaust-gas turbocharger 2, which communicates with the exhaust line 7c of the internal combustion engine 7. The outlet of the turbine 2b is connected to an exhaust-gas outlet AA.

The intake line 1b is connected to an inlet side of the switchover valve 5, which will be described in greater detail below.

The compressor 2a of the exhaust-gas turbocharger 2 is connected by a compressor line 2c to a charge-air cooler 3, which is connected by a charge-air line 3a both to a port u of a throttle valve 4a of the fresh-gas supply device 4 of what is known as a PBS (Pneumatic Booster System) and to another port on the inlet side of the switchover valve 5. In addition to the throttle valve 4a, the fresh-gas supply device 4 in this case has an additional-air valve 4c. The additional-air valve 4b is connected by an additional-air line 4c to a port for additional air ZL. The additional air ZL can come from a compressed-air tank (not shown), for example. The throttle valve 4a and the additional-air valve 4b are jointly connected on the outlet sides thereof to the intake manifold 7a of the internal combustion engine 7. A detailed description of a fresh-gas supply device 4 of this kind can be found in International Patent Publication No. WO2006/089779A1.

The switchover valve 5 is connected on the outlet side thereof to compressor 8 by a compressor inlet line 8a. Compressor 8 is driven by the internal combustion engine 7 in a manner not shown. As a separate or additional feature, it is also possible for it to have an electric drive motor. A compressor delivery line 8b is connected both to an inlet side of the discharge valve 9 and to an inlet of the air-processing unit 10 for a compressed-air system. An outlet of the air-processing unit 10 is connected to a port for compressor reservoir air KSL, which leads to a compressed-air tank (not shown), for example. The outlet side of the discharge valve 9 is connected to a compressor air outlet KLA, which leads to the atmosphere.

The controller 6 is connected by control lines (indicated by dashes) to an engine control unit 11 of the internal combustion engine 7, the throttle valve 4a and the additional-air valve 4b of the fresh-gas supply device 4, the switchover valve 5 and the discharge valve 9. These valves 4a, 4b, 5 and 9 are electrically activated, for example, and have an electric drive. Other types of drive can, of course, be imagined. All these connections and further connections that are not shown, e.g. to the air-processing unit 10 and the exhaust-gas turbocharger 2, can be components of a bus system, e.g. a CAN bus, of a vehicle having the internal combustion engine 7.

FIG. 2 shows a first operating state of the apparatus, e.g. when the internal combustion engine 7 is operated at constant speed. In this case, compressor 8 operates in what is known as a suction intake mode. This means that the air compressed by said compressor is drawn in through the air inlet LE and, in the process, flows via the intake line 1b, through the switchover valve 5, into the compressor inlet line 8a. In this first operating state, the switchover valve 5 is switched in such a way that the intake line 1b is connected by means of valve position u/y of the switchover valve 5 to the compressor inlet line 8a. The charge-air line 3a, which is also connected to the switchover valve 5, is closed by means of valve position w of the switchover valve 5. The discharge valve 9 is in the closed position, i.e. the compressor delivery line 8b, which is connected to the discharge valve 9, is blocked by position v of the discharge valve 9. In the first operating state of the apparatus, compressor 8 thus produces compressed air from the air inlet LE, which it draws in and delivers through the compressor delivery line 8b to the air-processing unit 10, e.g. for storage in a compressed-air tank.

If the internal combustion engine requires transitional power, i.e. transient power, the engine control unit 11 selects activation of the fresh-gas supply device 4 via the CAN bus, for example. At the same time, the control device 6 receives information on the imminent activation of the fresh-gas supply device 4. As soon as the throttle valve 4a is closed (ports v and x blocked) and a process of injecting additional air ZL through the opened additional-air valve 4b (ports u and w connected) into the intake manifold 7a of the internal combustion engine 7 begins, the switchover valve 5 is switched to the valve position shown in FIG. 3, in which the compressor inlet line 8a is connected to the charge-air line 3a by means of valve position x/z of the switchover valve 5. In this case, the intake line 1b is closed by the valve position v of the switchover valve 5.

Figure 3:
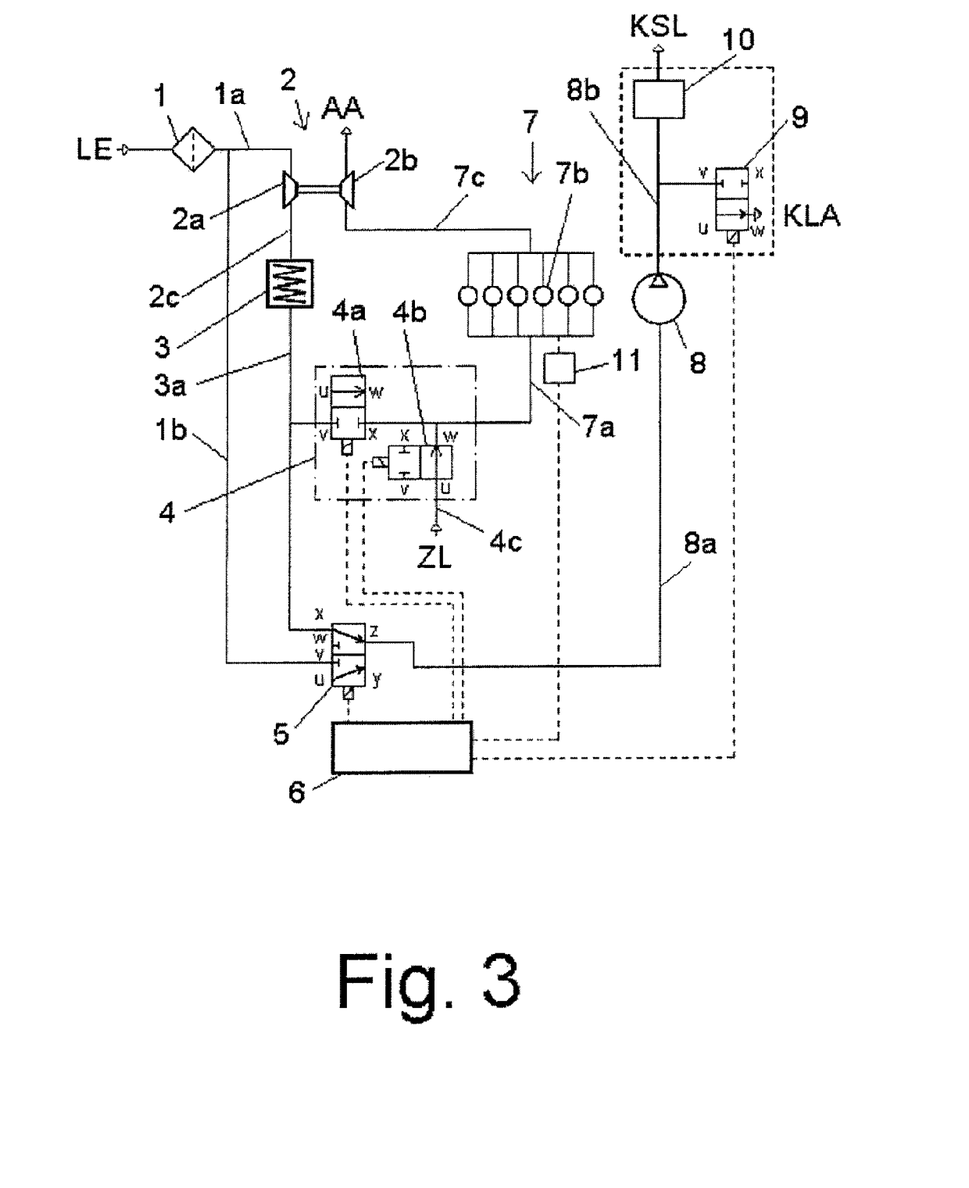
FIG. 3 shows the schematic block diagram according to FIG. 2 in a second operating state.

In the schematic block diagram of the apparatus according to FIG. 3, a second operating state of the apparatus is shown, in which compressor 8 is operating in a pressure-charged mode.

Owing to the connection of the charge-air line 3a to the compressor inlet line 8a, compressor 8 receives compressed charge air from the charge-air cooler 3 from the compressor 2a of the exhaust-gas turbocharger 2. This makes it possible to divert a mass flow from compressor 2a and thus avoid pumping of the exhaust-gas turbocharger 2 since compressor 2a remains in the stable range of the characteristic map thereof through the delivery of this mass flow outside the unstable range B (see FIG. 1).

Figure 4:
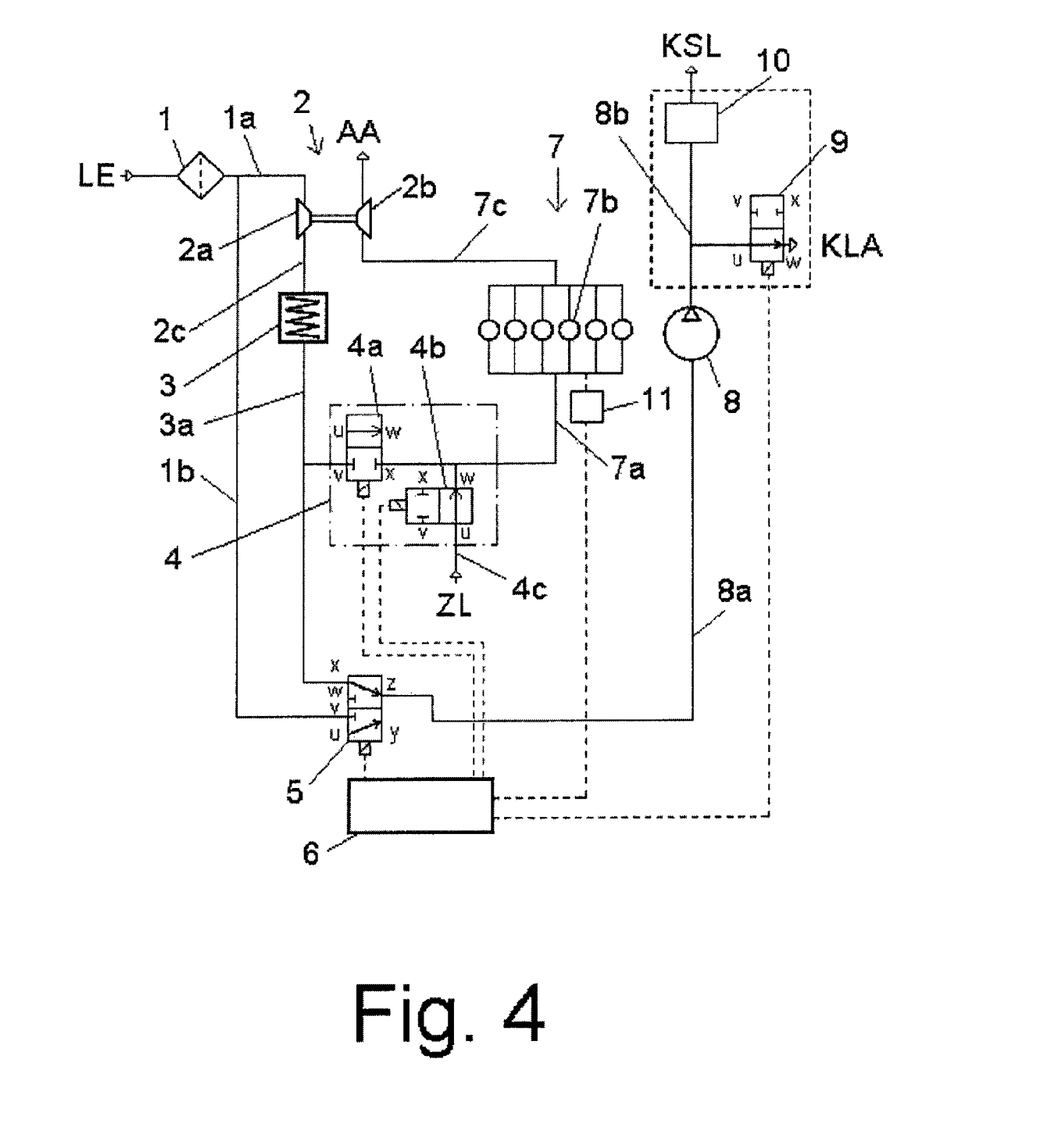
FIG. 4 shows the schematic block diagram according to FIG. 2 in a third operating state.

If this diverted mass flow is still too small, the control unit 6 can simultaneously receive a signal for opening the discharge valve 9. In FIG. 4, this is indicated by a schematic block diagram in a third operating state of the apparatus. Thus, by means of the continued existence of position x/z of the switchover valve 5, an air path is formed for discharging the air mass flow from the charge-air line 3a into the compressor inlet line 8a, through compressor 8 into the compressor delivery line 8b and, by virtue of the discharge valve 9 being in position u/w, via the compressor air outlet KLA to the atmosphere. The maximum possible mass flow via this air path depends inter alia on the cross section of the discharge valve 9. With the aid of this mass flow of air through compressor 8, an abrupt cutoff of the mass flow in compressor 2a of the exhaust-gas turbocharger 2 is prevented, preventing the occurrence of turbocharger pumping when the throttle valve 4a of the fresh-gas supply device 4 is closed and ensuring stable operation of the exhaust-gas turbocharger.

The magnitude of the diverted mass flow can be determined by means of the air-processing unit 10, for example. It is furthermore possible for this purpose to arrange suitable measured-value transmitters, e.g. pressure pickups, at the compressor 2a of the exhaust-gas turbocharger 2 and/or on the inlet side of the throttle valve 4a in the fresh-gas supply device 4.

After the end of activation of the fresh-gas supply device 4, there is no longer a risk of turbocharger pumping. After the throttle valve 4a has opened again, the discharge valve 9 is closed again. The switchover valve 5 can then either leave compressor 8 in the pressure-charged mode (position x/z) or switch it back into the naturally aspirated mode (position u/y), depending on the current operating parameters (explained below).

For example, compressor 8 should be switched to the naturally aspirated mode in the case of full-load acceleration of the internal combustion engine 7—after activation of the fresh-gas supply device 4—in order to avoid a drop in the boost pressure of compressor 2a.

The apparatus is capable not only of preventing turbocharger pumping but also of producing the following advantages.

Current exhaust-gas turbochargers 2 often have what is known as a waste gate valve (not shown). This valve opens above a certain boost pressure in compressor 2a and diverts a predetermined mass flow of exhaust gas past the turbine 2b of the exhaust-gas turbocharger 2. This prevents the exhaust-gas turbocharger 2 and/or the internal combustion engine 7 from being damaged. Thus, the energy of the diverted exhaust gas is not used. In these phases of activation of the waste gate valve, the switchover valve 5 can always be switched to the position x/z in which compressor 8 operates in the pressure-charged mode. In this way, the available mass flow of exhaust gas can be fully used in order to feed additional charge air not required by the internal combustion engine 7 by means of compressor 2a to compressor 8 and thus to a compressed-air system connected thereto for storage.

In addition, the switchover valve 5 can also be switched in overrun phases of the internal combustion engine 7 to the position x/z in which compressor 8 operates in the pressure-charged mode. Here too, available energy can be used.

Figure 5:
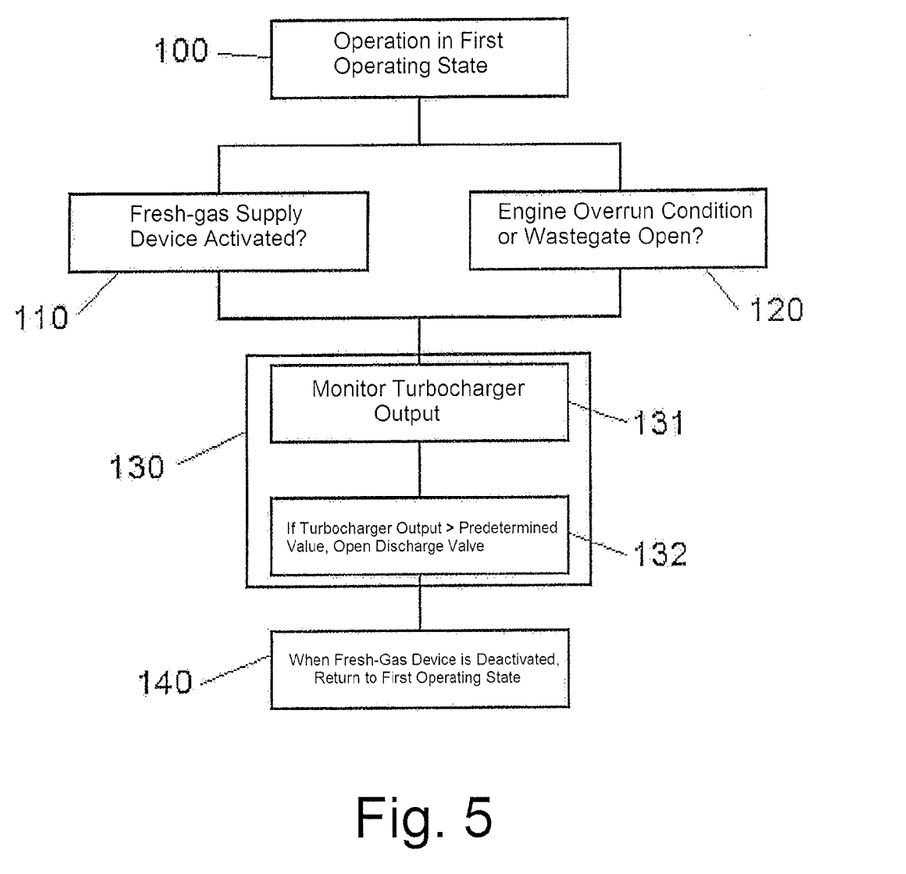
FIG. 5 shows a flow diagram of an embodiment of the method according to the present invention.

FIG. 5 shows a flow diagram of an illustrative embodiment of the method according to the invention for regulating stable operation of an exhaust-gas turbocharger 2 of an internal combustion engine 7.

In a first method step 100, compressor 8 is operated in the suction intake mode in a first operating state, wherein the switchover valve 5 connects the compressor inlet line 8a to the air inlet LE via the intake line 1b. At the same time, operating parameters of the internal combustion engine 7 and the air-processing unit 10 are monitored.

In a second method step 110, transient power is required from the internal combustion engine 7, and the fresh-gas supply device 4 is activated. These processes are implemented on the basis of the monitored operating parameters.

After this, in a third method step 130 for regulating stable operation of the exhaust-gas turbocharger 2, compressor 8 is switched over from the suction intake mode to the pressure-charged mode. This is accomplished by the switchover valve 5 connecting the compressor inlet line 8a to the compressor 2a of the exhaust-gas turbocharger 2 and blocking or closing the intake line 1b.

Finally, there is a fourth method step 140, in which ending of the activation of the fresh-gas supply device 4 is detected on the basis of the monitored operating parameters. Compressor 8 is then switched back to the suction intake mode, with the switchover valve 5 connecting the compressor inlet line 8a to the intake line 1b and disconnecting the compressor inlet line 8a from the charge-air line 3a.

Method step 130 has two component steps 131 and 132. In component step 131, a boost pressure and/or a mass flow of the compressor 2a of the exhaust-gas turbocharger 2 is monitored by comparing the respective parameter with a predeterminable value. As soon as the respective parameter exceeds this comparison value, the discharge valve 9 is opened in component step 132 in order to connect the compressor delivery line 8b to the compressor air outlet KLA. Once the respective parameter has fallen below another predeterminable value, the discharge valve 9 is closed again.

In an alternative, second method step 120, the procedure is that, if the fresh-gas supply device 4 is not activated, the operating parameters are used to ascertain whether the internal combustion engine 7 is being operated in an overrun phase and/or whether a waste gate valve of the exhaust-gas turbocharger 2 is opened (if the turbocharger is fitted with such a valve). In each of these two cases, the third method step 130 is then carried out, and compressor 8 is switched to the pressure-charged mode.

The invention is not restricted to the illustrative embodiments described above. The invention can be modified within the scope of the attached claims.

Thus, for example, it is conceivable for the control device 6 to be part of the engine controller 11 or of the air-processing unit 10.

Moreover, the control device 6 can have tabular values for the respective compressor characteristic map in a storage device (not shown), the respective current operating point A (see FIG. 1) being determined on the basis of the monitored parameters and compressor 8 being switched to the respectively required mode in an appropriate manner by means of the switchover valve 5 in order to prevent the current operating point A from exceeding the pumping limit C and entering the unstable range B.

The throttle valve 4a, the additional-air valve 4b and/or the discharge valve 9 can also be designed as adjustable valves with a passage cross section that can be varied in stages or continuously. In this context, such a discharge valve 9 makes possible particularly flexible adaptation by means of adjustable mass flows.

The fresh-gas supply device 4 can be of the kind described in WO2006/089779A1.

LIST OF REFERENCE NUMERALS 1 air filter
1a compressor intake line
1b intake line
2 exhaust-gas turbocharger
2a compressor
2b turbine
2c compressor line
3 charge-air cooler
3a charge-air line
4 fresh-gas supply device
4a throttle valve
4b additional-air valve
4c additional-air line
5 switchover valve
6 control device
7 internal combustion engine
7a intake manifold
7b cylinder
7c exhaust line
8 compressor
8a compressor inlet line
8b compressor delivery line
9 discharge valve
10 air-processing unit
100 . . . 140 method steps
A operating point
AA exhaust-gas outlet
B unstable range
C pumping limit
D characteristics of equal efficiency
E characteristics of equal speed
F characteristics of surge-free inflow
KLA compressor air outlet
KSA compressor reservoir air
LE air inlet
ZL additional air
u . . . z valve port The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for regulating stable operation of an exhaust-gas turbocharger of an internal combustion engine having a fresh-gas supply device, a switchover valve, a control device, a compressor for generating compressed air and an air-processing unit with a discharge valve, comprising the acts of:

operating the compressor in a suction intake mode in which the switchover valve connects the compressor to an air inlet;

monitoring operating parameters of the internal combustion engine, of the air-processing unit and of the exhaust-gas turbocharger when the compressor is in the suction intake mode;
determining based on the monitored operating parameters whether to switch the switchover valve from the suction intake mode;
switching the switchover valve to switch over the compressor from the suction intake mode to a pressure-charged mode in which the switchover valve connects the compressor to an exhaust-gas turbocharger compressor;
monitoring operating parameters of the internal combustion engine, of the air-processing unit and of the exhaust-gas turbocharger when the compressor is in the pressure-charged mode;
determining based on the monitored operating parameters whether to switch the switchover valve from the pressure-charged mode; and
switching the switchover valve to switch over the compressor on the basis of the monitored operating parameters from the pressure-charged mode to the suction intake mode,
wherein
the monitoring of operating parameters includes monitoring operation of a waste gate valve of the exhaust-gas turbocharger,
the switching-over of the compressor from the suction intake mode to the pressure-charged mode occurs when the waste gate valve is opened, and
the switching-over of the compressor from the pressure-charged mode to the suction intake mode occurs after the waste gate valve is closed.

2. The method as claimed in claim 1, wherein
the monitoring of operating parameters includes
monitoring a boost pressure and/or a mass flow of the exhaust-gas turbocharger compressor, and
connecting an outlet of the compressor to atmosphere by opening the discharge valve.

3. The method as claimed in claim 2, wherein
the discharge valve is opened in at least one of stages and continuously.

4. The method as claimed in claim 1, wherein
the monitoring of operating parameters includes monitoring operation of the fresh-gas supply device,
the switching-over of the compressor from the suction intake mode to the pressure-charged mode occurs when the fresh-gas supply device is activated, and
the switching-over of the compressor from the pressure-charged mode to the suction intake mode occurs when the fresh-gas supply device is deactivated.

5. The method as claimed in claim 1, wherein
the monitoring of operating parameters includes
monitoring operation of the internal combustion engine to identify an internal combustion engine overrun operating phase,
monitoring operation of the fresh-gas supply device,
the switching-over of the compressor from the suction intake mode to the pressure-charged mode occurs when the fresh-gas supply device is deactivated at the beginning of the overrun phase, and
the switching-over of the compressor from the pressure-charged mode to the suction intake mode occurs after the overrun phase operation ends.

6. An apparatus for carrying out a method for regulating stable operation of an exhaust-gas turbocharger of an internal combustion engine, having:
a fresh-gas supply device configured to inject additional air into the internal combustion engine when there is a requirement for transient power;
a compressor configured to produce compressed air;
an air-processing unit arranged to receive the produced compressed air, the air-processing unit having a discharge valve;
a switchover valve configured to connect the compressor to an air inlet in a suction intake mode of the compressor and to connect the compressor to a compressor of the exhaust-gas turbocharger in a pressure-charged mode of the compressor; and
a control device configured to control the switchover valve for regulating stable operation of an exhaust-gas turbocharger, wherein the control device is configured to
monitor operating parameters of the internal combustion engine, of the air-processing unit and of the exhaust-gas turbocharger when the compressor is in the suction intake mode;
determine based on the monitored operating parameters whether to switch the switchover valve from the suction intake mode;
switch the switchover valve to switch over the compressor from the suction intake mode to a pressure-charged mode in which the switchover valve connects the compressor to an exhaust-gas turbocharger compressor;
monitor operating parameters of the internal combustion engine, of the air-processing unit and of the exhaust-gas turbocharger when the compressor is in the pressure-charged mode;
determine based on the monitored operating parameters whether to switch the switchover valve from the pressure-charged mode; and
switch the switchover valve to switch over the compressor on the basis of the monitored operating parameters from the pressure-charged mode to the suction intake mode,
wherein
the monitoring of operating parameters includes monitoring operation of a waste gate valve of the exhaust-gas turbocharger,
the switching-over of the compressor from the suction intake mode to the pressure-charged mode occurs when the waste gate valve is opened, and
the switching-over of the compressor from the pressure-charged mode to the suction intake mode occurs after the waste gate valve is closed.

7. The apparatus as claimed in claim 6, wherein
the control device controls operation of the discharge valve.

8. The apparatus as claimed in claim 7, wherein the control device is part of an engine controller or of the air-processing unit.

9. The apparatus as claimed in claim 6, wherein
the fresh-gas supply device includes a throttle valve and an additional-air valve.

10. The apparatus as claimed in claim 9, wherein
at least one of the throttle valve, the additional-air valve and the discharge valve are configured to be adjusted in at least one of stages and continuously.

* * * * *